US007720014B2

(12) United States Patent
Kim

(10) Patent No.: US 7,720,014 B2
(45) Date of Patent: May 18, 2010

(54) METHOD AND APPARATUS FOR MANAGING A SUPPLEMENTAL CHANNEL IN A MOBILE COMMUNICATION SYSTEM

(75) Inventor: Jae-Won Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 909 days.

(21) Appl. No.: 11/316,929

(22) Filed: Dec. 27, 2005

(65) Prior Publication Data

US 2006/0159056 A1   Jul. 20, 2006

(30) Foreign Application Priority Data

Dec. 27, 2004   (KR)   ............... 2004-112978

(51) Int. Cl.
*H04B 7/216* (2006.01)
(52) U.S. Cl. .............. 370/278; 370/329; 370/330; 370/337; 370/338; 370/342
(58) Field of Classification Search ............ 370/342, 370/335, 441, 278, 329, 330, 337, 338; 455/522, 455/335, 479, 328, 320, 342
See application file for complete search history.

(56) References Cited

U.S. PATENT DOCUMENTS

| 6,377,809 | B1* | 4/2002 | Rezaiifar et al. | ............ 455/455 |
|---|---|---|---|---|
| 6,882,632 | B1* | 4/2005 | Koo et al. | .................... 370/335 |
| 7,292,553 | B2* | 11/2007 | Tiedemann et al. | ......... 370/335 |
| 2001/0036831 | A1* | 11/2001 | Rezaiifar et al. | ............ 455/455 |
| 2003/0067920 | A1* | 4/2003 | Rezaiifar et al. | ............ 370/394 |
| 2004/0258012 | A1* | 12/2004 | Ishii | .......................... 370/328 |
| 2006/0040691 | A1* | 2/2006 | Diep et al. | .................. 455/518 |
| 2007/0077936 | A1* | 4/2007 | Tomisawa et al. | ........... 455/450 |

FOREIGN PATENT DOCUMENTS

| KR | 2001-0042184 A | 5/2001 |
|---|---|---|
| KR | 2001-0054506 A | 7/2001 |
| KR | 2003-0045372 A | 6/2003 |
| KR | 2004-0042233 A | 5/2004 |

\* cited by examiner

*Primary Examiner*—Patrick N. Edouard
*Assistant Examiner*—Julio Perez
(74) *Attorney, Agent, or Firm*—Roylance, Abrams, Berdo & Goodman, LLP

(57) ABSTRACT

Provided is a method and apparatus for managing an SCH in an MS in a mobile communication system are provided. The MS receives an SCH assignment message notifying assignment of the SCH from a BS. If the duration of the SCH expires, the MS receives at least one more frame on the SCH and performs an error check on the at least one frame. If the at least one frame turns out to not be erroneous in the error check, the MS extends the duration of the SCH.

10 Claims, 5 Drawing Sheets

METHOD AND APPARATUS FOR MANAGING A SUPPLEMENTAL CHANNEL IN A MOBILE COMMUNICATION SYSTEM

CROSS-REFERENCE TO RELATED PATENT APPLICATION

This application claims the benefit under 35 U.S.C. § 119 (a) of Korean Patent Application No. 2004-112978, filed Dec. 27, 2004, in the Korean Intellectual Property Office, the entire disclosure of which is hereby incorporated by reference.

BACKGROUND OF THE INVENTION

1. Field of the Invention

The present invention relates to a method and apparatus for managing a physical channel in a mobile communication system. More particularly, the present invention relates to a method and apparatus for managing a Supplemental CHannel (SCH) in a Code Division Multiple Access (CDMA) system for providing a data communication service.

2. Description of the Related Art

Current mobile communication networks provide a high-speed data service in addition to a traditional voice service. A high-speed data service enables a multimedia service which includes the transmission of moving pictures as well as e-mail and still images through mobile terminals. Exemplary mobile communication systems that support the high-speed data service include the synchronous CDMA2000 1x system and asynchronous Universal Mobile Telecommunication System (UMTS). A mobile communication system that supports the multimedia service transmits packet data having different properties than traditional voice data.

For example, packet data is bursty unlike voice data. Therefore, instead of having a continuous stream of a constant amount of data, as is the case with voice data, packet data typically occurs in short bursts of a large amount of data. Accordingly, the mobile communication system additionally assigns an SCH as well as a Fundamental CHannel (FCH) as traffic channels in order to stably transmit a burst of packet data. A mobile station (MS) and a base station (BS) each have a module for managing radio resources including network-specified channels like the FCH and the SCH.

FIG. 1 illustrates a simplified configuration of a conventional mobile communication system using the SCH. Referring to FIG. 1, an MS 10 and a BS 20 wirelessly communicate on channels in accordance with wireless communications standards. For this purpose, radio resource managers 11 and 21 in the MS 10 and the BS 20 assign and/or release radio channels, including the SCH, and provide control for the radio resources of the MS 10 and the BS 20. In particular, the radio resource controller 11 of the MS 10 controls the operation of receiving an SCH assignment message from the BS 20 and receiving data on an assigned SCH for a predetermined period of time.

FIG. 2 is a flowchart illustrating an SCH managing method in a conventional mobile communication system. This procedure is carried out in the radio resource manager 11 of the MS 10 illustrated in FIG. 1.

Referring to FIG. 2, upon the generation of a burst of packet data to be transmitted to the MS 10, the BS 20 transmits an SCH assignment message to the MS 10 on an FCH in order to assign an SCH to the MS 10. The SCH assignment message is known as Supplemental Channel Assignment Message (SCAM) in an IS-95B system and as an Extended SCAM (ESCAM) in an IS-2000 system. Upon receipt of the SCH assignment message in step 201, the MS 10 determines whether it is time to receive data on an assigned SCH in step 203.

The SCH assignment message typically includes information about an assigned time for data transmission on an SCH and a duration for which the data transmission is valid. If the assigned time has come in step 203, the MS 10 receives data from the BS 20 on the assigned SCH in step 205. In step 207, the MS 10 determines whether the duration has expired during the data reception. The data reception continues during the duration. Upon expiration of the duration, the MS 10 releases the SCH and ends the data transmission in step 209.

Meanwhile, to make the burst data transmission efficient, after transmitting an SCH assignment message to the MS 10, the BS 20 transmits another successive SCH assignment message before the duration expiration. The MS 10 receives the new SCH assignment message before the duration expiration of the assigned SCH and if it is determined that the SCH is again assigned, the MS 10 continues receiving burst data during a new duration. If the duration of the assigned SCH expires before receiving the new SCH assignment message on the FCH, the MS 10 releases the existing SCH and ends the burst data reception.

As described above, SCH assignment depends predominantly on the transmission of the SCH assignment message on the FCH. After transmitting an SCH assignment message, the BS transmits burst data on an assigned SCH during a duration that begins with the assigned time. Radio Configuration (RC) 3 or above, which defines the SCH, provides that a Frame Error Rate (FER) is maintained at or below a predetermined level through forward power control, and the FCH errors at all times are at or below a level set by the BS. RC 3 is a radio configuration provided in C.S0002-C v1.0 for the reverse power control sub-channel in CDMA2000 1x, the entire contents of which is hereby incorporated by reference.

In the case where the MS fails to receive the SCH assignment message on the FCH due to transmission errors, the BS still transmits burst data on the SCH at the assigned time because it has already transmitted the message. However, the MS cannot receive the burst data until after receiving the next SCH assignment message. Thus, the MS requests a retransmission of data to the BS with sequence numbers that it has not received and the BS correspondingly retransmits the data. As a result, the efficiency of the whole system and data reception throughput are decreased.

Accordingly, there is a need for an improved method and apparatus for managing a physical channel in a mobile communication system that doesn't decrease system efficiency or data reception throughput when an MS failed to receive the SCH assignment message on the FCH due to transmission errors.

SUMMARY OF THE INVENTION

An aspect of the present invention is to address at least the above problems and/or disadvantages and to provide at least the advantages described below. Accordingly, an aspect of the present invention is to provide a method and apparatus for managing an SCH in an MS in a mobile communication system.

An exemplary embodiment of the present invention provides a method and apparatus for managing the duration of an SCH in an MS in a mobile communication system.

An exemplary embodiment of the present invention provides a method and apparatus for receiving data on an SCH in an MS even though it has failed to receive an SCH assignment message in a mobile communication system.

According to aspect of an exemplary embodiment of the present invention, in a method of managing an SCH in an MS in a mobile communication system, the MS receives an SCH assignment message notifying assignment of the SCH from a BS. If the duration of the SCH expires, the MS receives at least one more frame on the SCH and performs an error check on the at least one frame. If the at least one frame turns out to not be erroneous in the error check, the MS extends the duration of the SCH.

According to another aspect of an exemplary embodiment of the present invention, in an apparatus for managing an SCH in an MS in a mobile communication system, a reception module receives frame data through an antenna over a wireless network and decodes the received frame data. An error checker performs an error check on information bits of the decoded frame. A controller controls the reception mode to receive at least one more frame on the SCH if a new SCH assignment message is not received before expiration of the duration of the SCH, performs an error check on the at least one frame, and determines whether to extend the SCH duration according to the error check.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
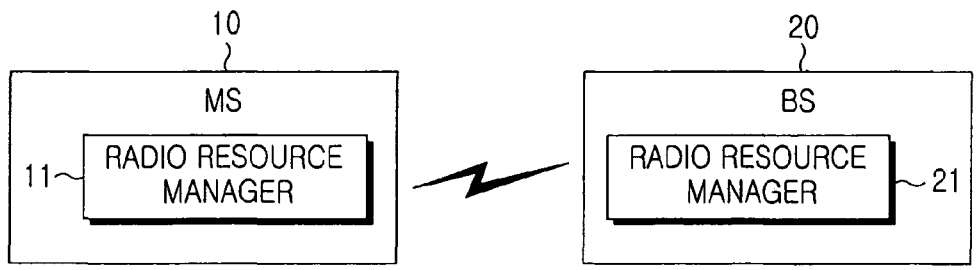
FIG. 1 illustrates a simplified configuration of a conventional mobile communication system using the SCH.
Figure 2:
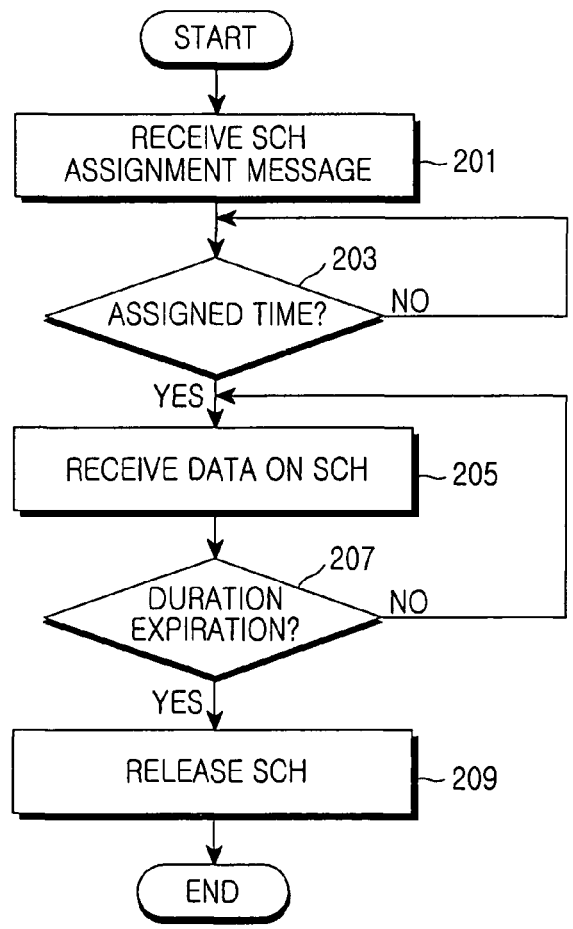
FIG. 2 is a flowchart illustrating an SCH managing method in a conventional mobile communication system.
Figure 3:
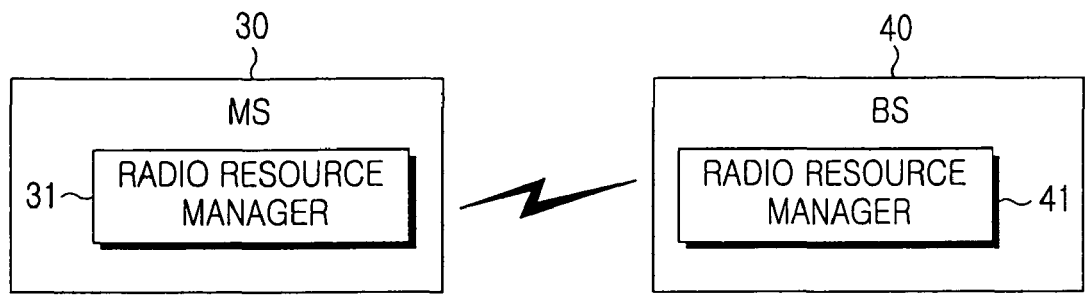
FIG. 3 illustrates a simplified configuration of a mobile communication system for managing the SCH according to an exemplary embodiment of the present invention.

FIG. 3 illustrates a simplified configuration of a mobile communication system for managing the SCH according to an exemplary embodiment of the present invention. Referring to FIG. 3, an MS 30 and a BS 40 wirelessly communicate on channels in accordance with wireless communications standards. For this purpose, radio resource managers 31 and 41 in the MS 30 and the BS 40 assign and/or release radio channels, including the SCH, and provide control to the radio resources of the MS 30 and the BS 40. In an exemplary embodiment of the present invention, the radio resource controller 31 of the MS 30 controls the operation of receiving an SCH assignment message from the BS 40 and receiving data on an assigned SCH for a time period that is equal to the sum of a duration set for the SCH and a predetermined number of frame durations.

A description will now be made of the basic concept of SCH management according to an exemplary embodiment of the present invention in the system illustrated in FIG. 3.

In a conventional mobile communication system, if the MS 30 fails to receive the first SCH assignment message from the BS 40, there is no way to receive burst data from the BS 20 on an assigned SCH. Further, in a conventional mobile communication system, if the MS 30 succeeds in receiving an SCH assignment message but fails to receive another successive SCH assignment message from the BS 40, the MS 30 cannot receive burst data on an SCH upon expiration of an SCH duration set in the received SCG assignment message, despite continuous transmission from the BS.

In an exemplary embodiment of the present invention, however, the MS 30 receives at least one more frame of data after the duration expiration of the SCH and if the frame turns out to not be erroneous, the MS 30 extends the duration of the SCH. To do so, the MS 30, which has failed to receive another successive SCH assignment message, receives at least one more frame of data and performs a Cyclic Redundancy Code (CRC) check on the frame of data.

Figure 4:
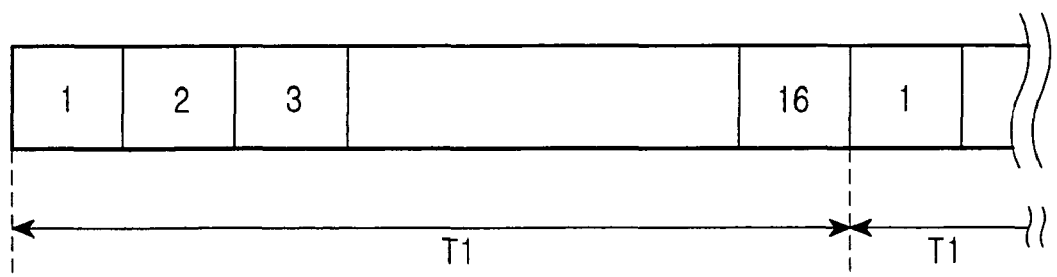
FIG. 4 illustrates exemplary frames transmitted to an MS on the SCH in a CDMA2000 1x system.

FIG. 4 illustrates exemplary frames transmitted to the MS 30 on the SCH in the CDMA2000 1x system. In general, 16 frames are transmitted during a duration T1 indicated by an SCH assignment message in the CDNA2000 1x system. In accordance with an exemplary embodiment of the present invention, in the case where the MS 30 receives an SCH assignment message but fails to receive the next SCH assignment message, it receives 16 frames during a duration T1 indicated by the received SCH assignment message and then one more frame. The MS 30 performs a CRC check on the additionally received frame.

If the CRC result is good, the MS 30 continues receiving data by doubling the SCH duration, when the SCH has been assigned normally and the MS 30 has failed to receive the next SCH assignment message. A good CRC check result indicates that the one more frames are not erroneous.

Figure 5A:
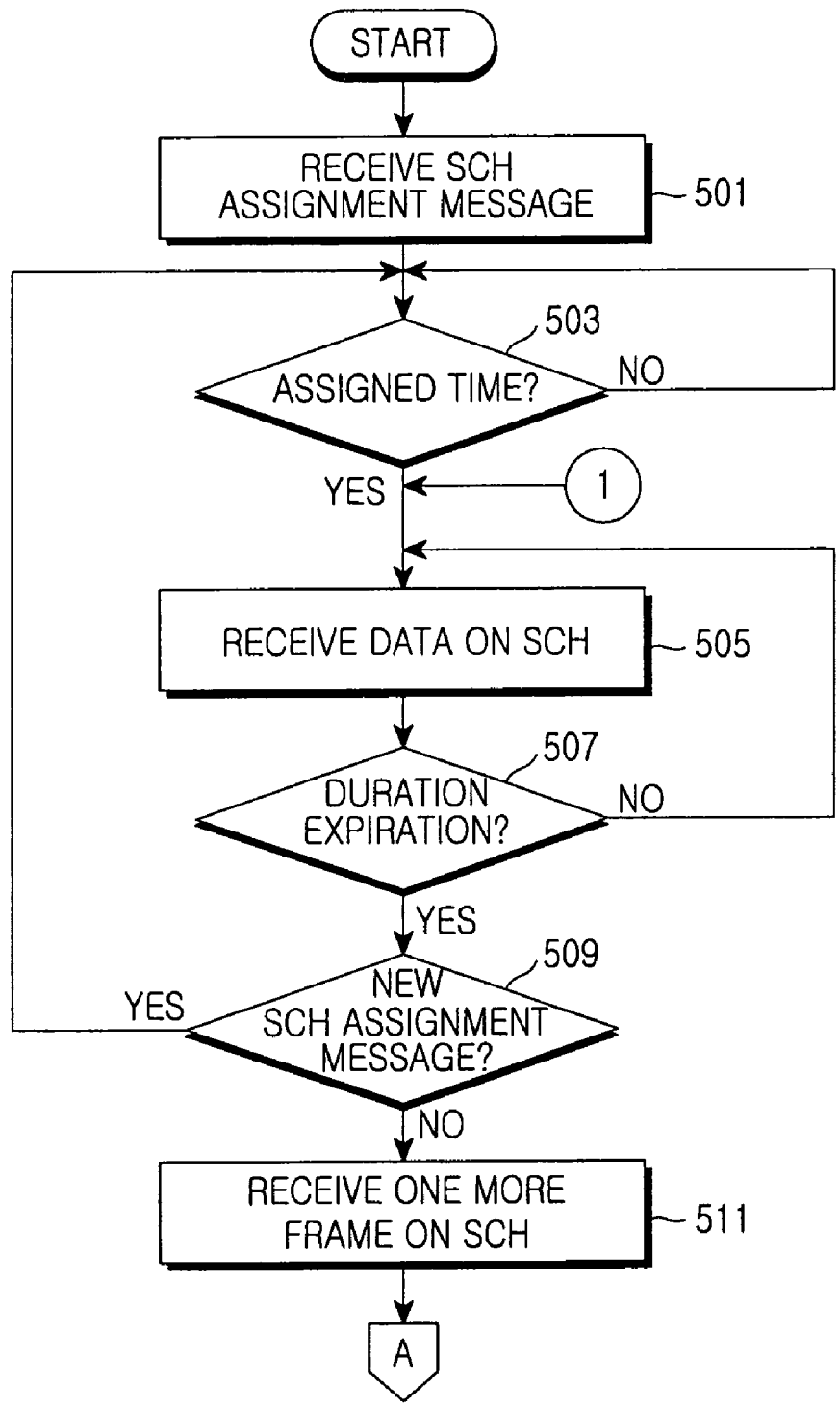
FIGS. 5A and 5B are flowcharts illustrating an SCH managing method according to an exemplary embodiment of the present invention.
Figure 5B:
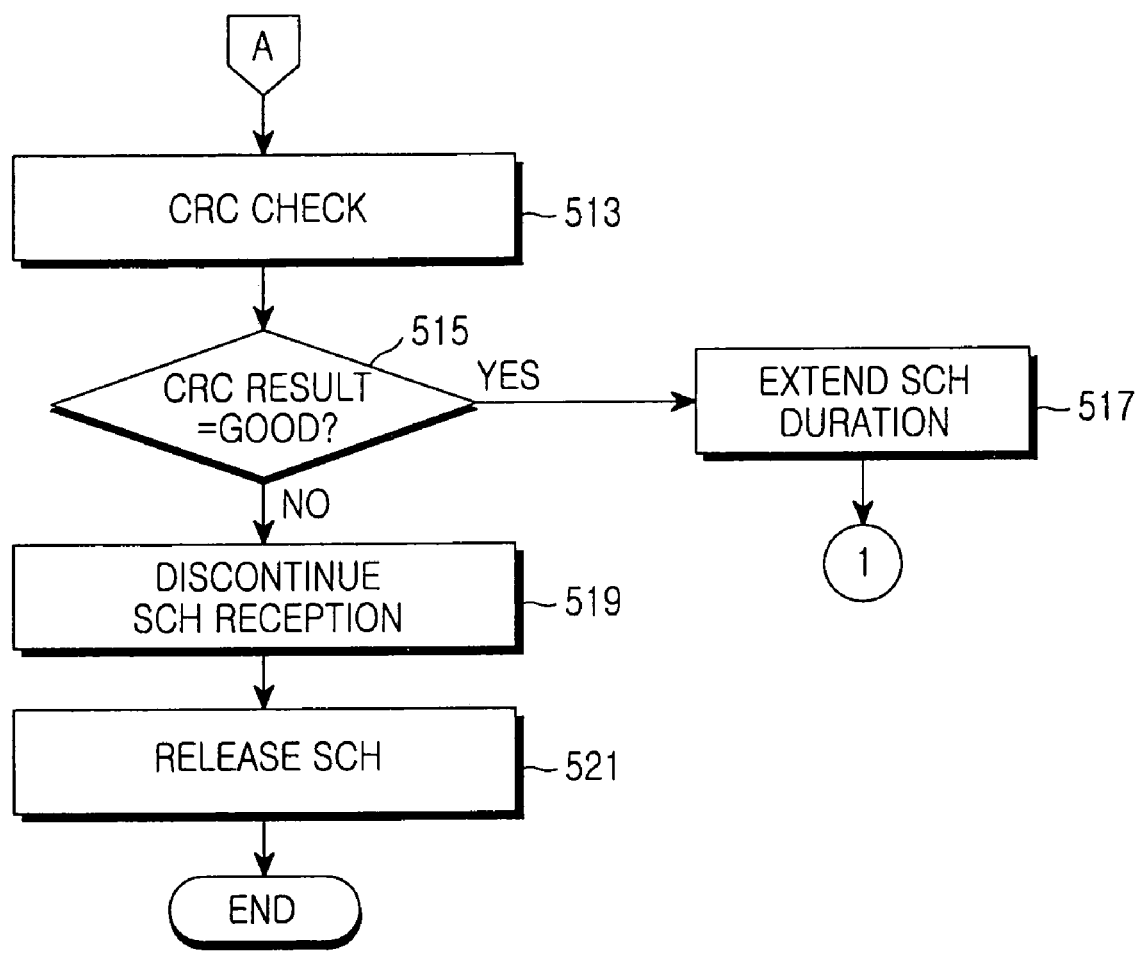

FIGS. 5A and 5B are flowcharts illustrating an SCH managing method according to an exemplary embodiment of the present invention. For notational simplicity, it is assumed that the MS receives one more frame after the expiration of a predetermined SCH duration.

Referring to FIGS. 5A and 5B, upon the generation of burst data to be transmitted to the MS, the BS transmits an SCH assignment message to the MS. Upon receipt of the SCH assignment message in step 501, the MS determines whether it is time to receive data on an assigned SCH in step 503. At the assigned time, the MS receives burst data from the BS on the assigned SCH in step 505. While receiving the data, the MS determines whether the duration of the assigned SCH has expired in step 507. The data reception continues during the duration. Upon expiration of the duration, the MS determines whether the next SCH assignment message has been received before the time expiration in step 509. If the next SCH assignment message has been received, the MS returns to step 503.

If the next SCH assignment message has not been received, the MS receives one more frame on the current SCH in step 511, instead of releasing the SCH as done conventionally. In step 513, the MS CRC-checks the received frame. In step 515 the MS determines if the CRC result is good or not. If the CRC result is good, the MS extends the duration of the SCH in step 517. An exemplary amount to extend the duration would be to double the original duration, but the duration may be extended by other amounts. A good CRC check result indicates that the one more frames are not erroneous.

Reception from the BS of one more frame whose CRC check result is good, after the duration expiration, means that the MS has failed to receive the next SCH assignment message on the FCH despite the BS having transmitted the burst data at an assigned time on the SCH under the same conditions as before. Therefore, the MS receives one more frame and if the CRC check result of the frame is good, the MS extends the SCH duration when the BS has transmitted the same SCH assignment message again. The MS then continues receiving burst data on the existing SCH in step 505. A good CRC check result indicates that the one more frames are not erroneous.

Meanwhile, if the CRC check result is bad in step 515, the MS discontinues the data reception on the SCH in step 519 and releases the SCH in step 521. A bad CRC check result indicates that the one more frames are erroneous. Reception from the BS of one more frames whose CRC check result is bad, after the duration expiration, means either that the BS has transmitted no more burst data on the existing SCH or that despite burst data having been transmitted on the SCH, a different data rate or a different coding scheme has been applied to the burst data. In the latter case, the MS cannot receive data accurately from the BS until receiving an SCH assignment message again.

In an exemplary embodiment of the present invention, therefore, even though the MS fails to receive another SCH assignment message, it can receive burst data on the SCH as long as the burst data is under the same conditions as those of the previously received burst data in terms of data rate, coding or the like. Therefore, the number of retransmissions from the BS is reduced.

The results of a simulation comparing the conventional SCH managing method with an exemplary embodiment of the present invention will be described below.

Table 1 below illustrates the conditions of the simulation.

TABLE 1

| Simulation conditions | |
|---|---|
| SCH data rate | 153.6 kbps |
| Coding scheme | Turbo coding |
| FCH target FER | 1% |
| SCH target FER | 1% |
| Duration | 16 frames |
| Total download | 1 Mbyte |

Table 2 below presents a comparison between the conventional method and an exemplary embodiment of the present invention in terms of the number of sequences whose retransmission is requested to the BS by RLP, and reception throughput.

TABLE 2

| | Number of retransmission sequences | Throughput (kbps) |
|---|---|---|
| Conventional | 420 | 150.6 |
| Present | 212 | 152.1 |

As noted from Table 2, the exemplary embodiment of the present invention reduces the number of retransmission sequences to 50%, when compared to the conventional method.

Figure 6:
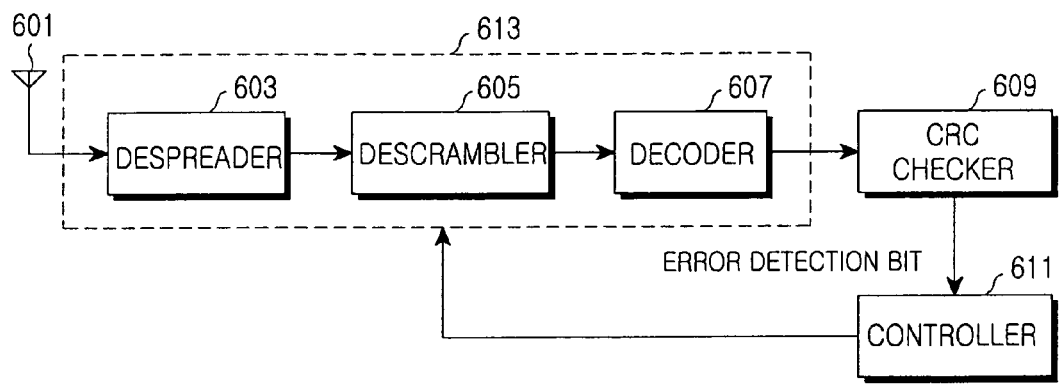
FIG. 6 is a block diagram of an MS for managing the SCH according to an exemplary embodiment of the present invention.

FIG. 6 is a block diagram of an MS for managing the SCH according to an exemplary embodiment of the present invention.

It is assumed that the BS inserts CRC bits for error detection in burst data, prior to transmission. As known, the MS receives an SCH assignment message on the FCH over a wireless network and receives the burst data on an SCH whose assigned time and duration are indicated by the SCH assignment message.

Referring to FIG. 6, a despreader 603 despreads frame data received from an antenna 601 over the wireless network with a Pseudo random Noise (PN) code and a Walsh code. A descrambler 605 descrambles the despread frame data and a decoder 607 decodes the descrambled data in a predetermined decoding method. A CRC checker 609 CRC-checks the information bits of the decoded frame data and notifies a controller 611 of the CRC check result using an error detection bit.

In FIG. 6, the despreader 603, the descrambler 605, and the decoder 607 are configured in a known manner and they are collectively called a reception module 613, for notational simplicity. While not shown, the controller 611 is provided with the radio resource manager 31 illustrated in FIG. 3, for receiving an SCH assignment message and managing the radio resources of the MS including assignment and/or release of channels, including the SCH.

Upon receipt of an SCH assignment message, the controller 611 prepares for data reception on an SCH by checking its assigned time and duration in the received message. The controller 611 starts to receive data on the SCH at the assigned time and the data reception continues during the duration. If the BS has more burst data to transmit before expiration of the duration, it transmits another SCH assignment message to the MS. The controller 611 controls the reception module 613 to continue receiving data during a duration indicated in the received SCH assignment message.

If the duration of the existing SCH expires without receiving another SCH assignment message, the controller 611 receives one more frames without releasing the SCH upon duration expiration and receives an error detection bit related to the frame from the CRC checker 609.

If the CRC check result is good, the controller 611 increases the SCH duration and controls the reception module 613 to continue receiving burst data on the existing SCH. A good CRC check result indicates that the one more frames are not erroneous. The SCH duration may be increased by the same amount as the previous duration. However, if the CRC check result is bad, the controller 611 discontinues data reception on the SCH and releases the SCH. A bad CRC check result indicates that the one more frames are erroneous.

As described above, exemplary embodiments of the present invention provide a method and apparatus for efficiently managing an SCH in a mobile communication system.

According to exemplary embodiments of the present invention, even though it fails to receive an SCH assignment message due to transmission errors, an MS can receive data on an SCH continuously.

Furthermore, the number of unnecessary data retransmissions is reduced, thereby improving the efficiency of the mobile communication system and the reception performance of the MS.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of managing a supplemental channel (SCH) in a mobile station (MS) in a mobile communication system, comprising the steps of:
    receiving first SCH assignment message notifying an assignment of a first SCH from a base station (BS), the first SCH assignment message comprising an assigned time for transmission on the first SCH and a duration during which the transmission is valid;
    receiving at least one frame on the first SCH without releasing the first SCH after the duration of the first SCH expires; and
    extending the duration of the first SCH using the received at least one frame;
    determining whether a second SCH assignment message is received before expiration of the first SCH duration;
    performing an error check on the at least one frame, when the second SCH assignment message is not received;
    receiving data on the at least one frame of the first SCH without releasing the first SCH if a result of the error check on the at least one frame indicates that the at least one frame is not erroneous.

2. The method of claim 1, further comprising the step of, receiving data on a second SCH assigned according to a second SCH assignment message when the second SCH assignment message is received.

3. The method of claim 2, further comprising the step of releasing the first SCH if the result of the error check on the at least one received frame indicates that the at least one received frame is erroneous.

4. The method of claim 2, wherein the error check is a cyclic redundancy code (CRC) check.

5. The method of claim 1, wherein the duration of the first SCH is extended by an amount of the duration of the first SCH comprised by the first SCH assignment message.

6. An apparatus for managing a supplemental channel (SCH) in a mobile station (MS) of a mobile communication system, comprising:
    a reception module for receiving a first SCH assignment message notifying an assignment of a first SCH from a base station (BS), the first SCH assignment message comprising an assigned time for transmission on the first SCH and a duration during which the transmission is valid, and receiving at least one frame on the first SCH according to controlling of a controller; and
    the controller for controlling the reception module to receive the at least one frame on the first SCH without releasing the first SCH after the duration of the first SCH expires, and extending the duration of the first SCH using the received at least one frame; and
    an error checker for performing an error check on the at least one frame according to controlling of the controller,
    wherein the controller determines whether a second SCH assignment message is received before expiration of the first SCH duration, performs an error check on the at least one frame, when the second SCH assignment message is not receive, receives data on the at least one frame of the first SCH without releasing the first SCH if a result of the error check on the at least one frame indicates that the at least one frame is not erroneous.

7. The apparatus of claim 6, wherein the controller releases the first SCH if the result of the error check indicates that the at least one received frame is erroneous.

8. The apparatus of claim 6, wherein the controller receives data on a second SCH assigned according to the-a second SCH assignment message when the second SCH assignment message is received.

9. The apparatus of claim 6, wherein the error check is a cyclic redundancy code (CRC) check.

10. The apparatus of claim 6, wherein the controller extends the duration of the first SCH by an amount substantially equal to a previous SCH duration.

* * * * *